US012461471B2

(12) United States Patent
Tadomi

(10) Patent No.: US 12,461,471 B2
(45) Date of Patent: Nov. 4, 2025

(54) IMAGE FORMING APPARATUS

(71) Applicant: CANON KABUSHIKI KAISHA, Tokyo (JP)

(72) Inventor: Takuma Tadomi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/750,427

(22) Filed: Jun. 21, 2024

(65) Prior Publication Data

US 2024/0427265 A1 Dec. 26, 2024

(30) Foreign Application Priority Data

Jun. 23, 2023 (JP) ................................ 2023-103662

(51) Int. Cl.
*G03G 15/20* (2006.01)
*G03G 15/00* (2006.01)

(52) U.S. Cl.
CPC ..... *G03G 15/2017* (2013.01); *G03G 15/2064* (2013.01); *G03G 15/5029* (2013.01)

(58) Field of Classification Search
None
See application file for complete search history.

(56) References Cited

U.S. PATENT DOCUMENTS 5,974,282 A * 10/1999 Yamada ............. G03G 15/0194 399/302
6,038,423 A * 3/2000 Tagawa .............. G03G 15/0194 399/302
2001/0022899 A1* 9/2001 Castelli ............. G03G 15/0152 399/9
2003/0129000 A1* 7/2003 Lee ...................... G03G 15/755 399/165

FOREIGN PATENT DOCUMENTS

JP 2015059964 A 3/2015

* cited by examiner

*Primary Examiner* — Sevan A Aydin
(74) *Attorney, Agent, or Firm* — Canon U.S.A., Inc. IP Division

(57) ABSTRACT

An image forming apparatus includes a fixing belt, a pressure rotary body, a nip forming member, a detection unit, and a control unit configured to control a sheet interval to be a first sheet interval and a second sheet interval, wherein the control unit is configured to, in a case where time taken for a center position of the fixing belt to move, in the width direction, from a first position to a second position is equal to or less than a threshold, control the sheet interval to be the first sheet interval, and wherein the control unit is configured to, in a case where the time taken for the center position of the fixing belt to move, from the first position to the second position is more than the threshold, control the sheet interval to be the second sheet interval.

7 Claims, 10 Drawing Sheets

| FIRST SENSOR 394 | SECOND SENSOR 395 | THIRD SENSOR 396 | BELT POSITION | POSITION OF BELT |
|---|---|---|---|---|
| 0 | 0 | 0 | 0 | OVERDISPLACEMENT ON FRONT SIDE |
| 1 | 0 | 0 | 1 | FRONT SIDE 3 |
| 1 | 1 | 0 | 2 | FRONT SIDE 2 |
| 0 | 1 | 0 | 3 | FRONT SIDE 1 |
| 0 | 1 | 1 | 4 | CENTER |
| 1 | 1 | 1 | 5 | BACK SIDE 1 |
| 1 | 0 | 1 | 6 | BACK SIDE 2 |
| 0 | 0 | 1 | 7 | BACK SIDE 3 |
| 0 | 0 | 0 | 0(8) | OVERDISPLACEMENT ON BACK SIDE |

SENSOR IS SHIELDED: 0 SENSOR IS OPEN: 1

IMAGE FORMING APPARATUS

BACKGROUND

Field of the Disclosure

The present disclosure relates to an image forming apparatus that forms an image on a recording material.

Description of the Related Art

An image forming apparatus that forms a toner image on a recording material includes a fixing device for fixing the formed toner image to the recording material. The fixing device includes a pair of rotary bodies, which applies heat and pressure to the recording material to perform fixing.

There has been a demand for speed-up of the image forming apparatus, and a belt type fixing system can be adopted to achieve the speed-up. The belt type fixing system includes an endless belt that applies heat to a recording material and a pressure rotary body in contact with the endless belt, which correspond to the pair of rotary body. The recording material is nipped and conveyed into a nip portion formed between the endless belt and the pressure rotary body to be fixed.

Japanese Patent Application Laid-Open No. 2015-59964 discusses a configuration of the above-mentioned belt type fixing system. Furthermore, Japanese Patent Application Laid-Open No. 2015-59964 also discusses a technique regarding steering control that controls the belt to be moved to a predetermined position in a width direction of the recording material. The belt in use of the belt type fixing system can become misaligned in the width direction during image formation. To correct this alignment, the steering control is performed. The steering control can also reduce a scratch caused by a cut edge of the recording material.

SUMMARY

According to an aspect of the present disclosure, an image forming apparatus includes a fixing belt having an endless shape and configured to be rotatable and apply heat to a recording material, a pressure rotary body contacting an outer circumferential surface of the fixing belt to form a nip portion, and configured to fix, together with the fixing belt, a toner image to the recording material, a nip forming member disposed on an inner circumferential surface of the fixing belt and forming, together with the pressure rotary body, the nip portion via the fixing belt, a detection unit configured to detect a position of the fixing belt in a width direction of the recording material, the width direction being orthogonal to a conveyance direction of the recording material, a steering roller configured to stretch and move the fixing belt in the width direction based on a detection result from the detection unit; and a control unit configured to control a sheet interval that is a distance between a predetermined recording material and a recording material subsequent to the predetermined recording material, wherein the control unit is configured to control the sheet interval to be a first sheet interval and a second sheet interval that is larger than the first sheet interval, wherein the control unit is configured to, in a case where time taken for a center position of the fixing belt to move, in the width direction, from a first position to a second position that is different from the first position is equal to or less than a threshold, control the sheet interval to be the first sheet interval, and wherein the control unit is configured to, in a case where the time taken for the center position of the fixing belt to move, in the width direction, from the first position to the second position is more than the threshold, control the sheet interval to be the second sheet interval.

Further features of the present disclosure will become apparent from the following description of exemplary embodiments with reference to the attached drawings.

DESCRIPTION OF THE EMBODIMENTS

<Image Forming Apparatus>

A schematic configuration of an image forming apparatus according to a first exemplary embodiment will be described with reference to FIG. 1.

Figure 1:
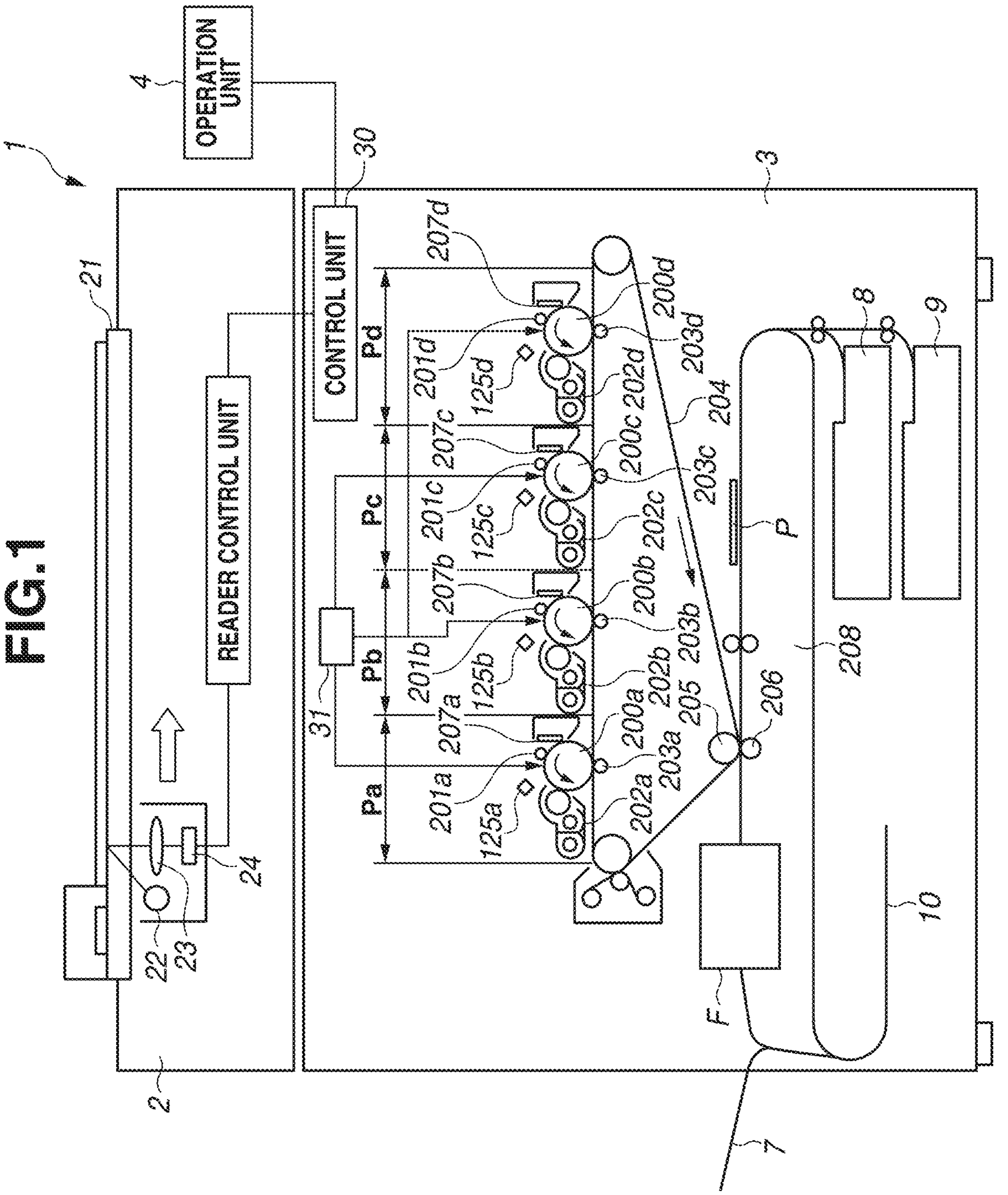
FIG. 1 is a schematic cross-sectional view illustrating an image forming apparatus according to a first exemplary embodiment.

FIG. 1 is a view illustrating the image forming apparatus for full-color images according to the present exemplary embodiment. An image forming apparatus 1 includes an image reading unit 2 and an image forming apparatus main body 3. The image reading unit 2 reads a document placed on a platen glass 21. Light emitted from a light source 22 is reflected by the document, and is formed as an image on a charge-coupled device (CCD) sensor 24 via an optical system member 23, such as a lens. Such optical system units can perform scanning in the direction of the arrow, converting the document into electric signal data columns on a line-by-line basis. An image signal obtained by the CCD sensor 24 is transmitted to the image forming apparatus main body 3, and then appropriate image processing for each image forming unit is performed by a control unit 30, which will be described below. Additionally, the control unit 30 receives an external input as the image signal from an external host device, for example, a print server.

The image forming apparatus main body 3 includes a plurality of image forming units Pa, Pb, Pc, and Pd, and each of the image forming units performs image formation based on the above-mentioned image signal. More specifically, the image signal is converted into laser beams subjected to pulse width modulation (PWM) by the control unit 30. In FIG. 1, a polygon scanner 31 as an exposure device performs scanning with laser beams depending on the image signal. Subsequently, photosensitive drums 200*a* to 200*d* as respective image bearing members of the image forming units Pa to Pd are irradiated with the laser beams.

The image forming unit Pa corresponds to a yellow (Y) image forming unit Pa. The image forming unit Pb corresponds to a magenta (M) image forming unit Pb. The image forming unit Pc corresponds to a cyan (C) image forming unit Pc. The image forming unit Pd corresponds to a black (Bk) image forming unit Pd. The image forming units Pa to Pd form images in corresponding colors. Since the image forming units Pa to Pd are substantially identical, the details of the Y image forming unit Pa alone will now be described, and the descriptions about the other image forming units are omitted.

The Y image forming unit Pa forms a toner image on the surface of the photosensitive drum 200*a* based on the image signal as subsequently described.

A primary charger 201*a* electrostatically charges the surface of the photosensitive drum 200*a* at a predetermined potential and prepares for forming an electrostatic latent image. The electrostatic latent image is formed on the surface of the photosensitive drum 200*a* electrostatically charged at the predetermined potential with the laser beams from the polygon scanner 31.

A developer device 202*a* develops the electrostatic latent image on the photosensitive drum 200*a* to form a toner image.

A transfer roller 203*a* performs discharge from the back surface of an intermediate transfer belt 204 by applying a primary transfer bias with the opposite polarity to the toner, and transfers the toner image on the photosensitive drum 200*a* onto the intermediate transfer belt 204. The surface of the photosensitive drum 200*a* after the transfer is cleaned with a cleaner 207*a*.

The toner image on the intermediate transfer belt 204 is conveyed to the subsequent image forming units in the order of Y, M, C, and Bk. The toner image formed by the respective image forming units in respective colors are sequentially transferred. The toner image in full-color is formed on the surface of the intermediate transfer belt 204. In a secondary transfer unit including a pair of secondary transfer rollers 205 and 206, the toner image that has passed through the Bk image forming unit Pd is secondarily transferred to a recording material P by applying a secondary transfer electric field with the opposite polarity of the toner image on the intermediate transfer belt 204. The recording material P fed from a paper feed cassette 8 or 9 is on standby at a registration unit 208. Timing is controlled to align the position of the toner image on the intermediate transfer belt 204 and the recording material P, and the recording material P is conveyed from the registration unit 208.

Thereafter, the toner image on the recording material P is fixed by the fixing device F as an image heating device. After passing through the fixing device F, the recording material P is discharged to the outside of the image forming apparatus 1.

In a double-sided job, after completion of the transfer and fixing of the toners on a first surface (one side) in image formation, the recording material P passes through a reversing unit 10 provided in the image forming apparatus 1, and the front side and back side of the recording material P are reversed. Thereafter, the recording material P is subjected to the transfer and fixing of the toners on a second surface (the other side) in the image formation, discharged to the outside of the image forming apparatus 1, and stacked on a sheet discharge tray 7.

A configuration of the fixing device F in the present exemplary embodiment will now be described with reference to FIG. 2.

<Fixing Device>

Figure 2:
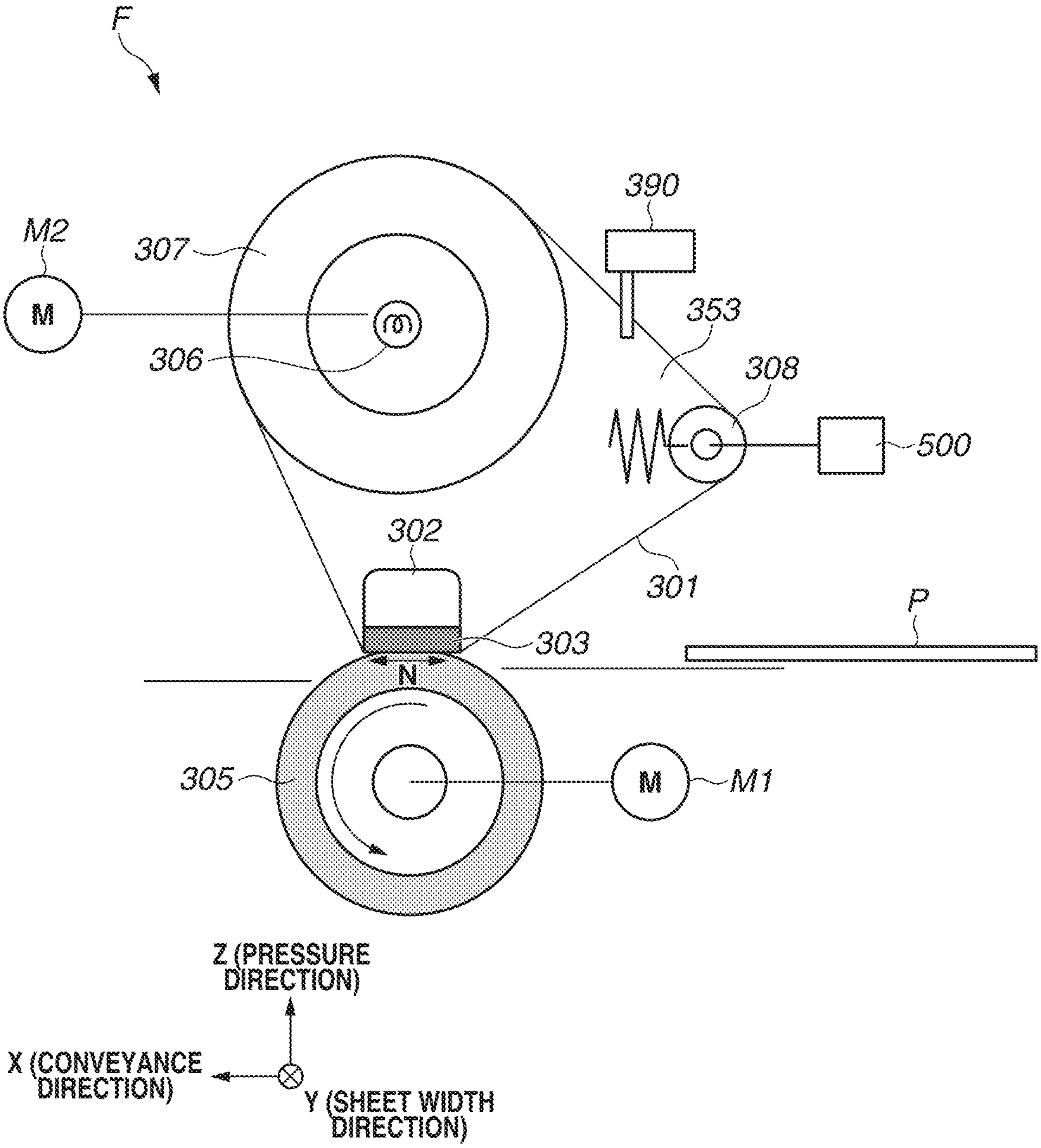
FIG. 2 is a schematic cross-sectional view illustrating a belt type fixing device.

FIG. 2 is a schematic view illustrating an entire configuration of the belt-heating-system fixing device F according to the present exemplary embodiment. In FIG. 2, an X-direction represents a conveyance direction of the recording material P, a Y-direction represents a width direction orthogonal to the conveyance direction, and a Z-direction represents a pressure direction. The width direction is a width direction of the recording material P, and the pressure direction is a direction from a pressure roller 305 toward a pad 303.

The fixing device F includes a pair of rotary bodies. One of the pair is a heating rotary body that heats the recording material P, and the other is a pressure rotary body in contact with the outer circumferential surface of the heating rotary body. The heating rotary body of the fixing device F in the present exemplary embodiment is a fixing belt, and the pressure rotary body is a pressure roller. A detailed configuration will be now described.

The fixing device F includes a rotatable endless fixing belt (hereinafter referred to as a belt) 301 as the heating rotary body, the pressure roller 305, and a nip forming member (hereinafter referred to as the pad) 303 that forms a fixing nip portion N via the belt 301. Furthermore, the fixing device F includes a stay 302 for supporting the pad 303, a heating roller 307 in contact with the inner circumferential surface of the belt 301 that heats the inner circumferential surface, and a steering roller 308.

The belt 301 is a thin cylindrical-shaped belt having heat conductivity and heat resistance. In the present exemplary embodiment, the belt 301 has a three-layer structure including a base layer, an elastic layer, and a releasable layer. The elastic layer is formed on the outer circumference of the base layer. The releasable layer is formed on the outer circumference of the elastic layer. The base layer, the elastic layer, and the releasable layer is not illustrated in FIG. 2. The base layer has a thickness of 80 μm, and a material thereof is polyimide resin (PI). The elastic layer has a thickness of 300 μm and a material thereof is silicone rubber. The releasable layer has a thickness of 30 μm and a material thereof is perfluoro alkoxy alkane (PFA) as fluororesin. The belt 301 is stretched by the pad 303, the heating roller 307, and the steering roller 308.

The pad 303 is pressed by the pressure roller 305 with the belt 301 interposed between the pad 303 and the pressure roller 305. Liquid crystal polymer (LCP) is used as a material of the pad 303. A slide member is interposed between the pad 303 and the belt 301.

The belt 301 is configured to slide smoothly on the slide member with an extra lubricant applied to the inner surface of the belt 301. Silicone oil (hereinafter referred to as an oil) is used as the above-mentioned lubricant.

The heating roller 307 is a stainless-steel pipe with a thickness of 1 mm. A halogen heater 306 as a heat source is disposed inside the heating roller 307, and the heating roller 307 can generate heat to a predetermined temperature. The belt 301 is heated by the heating roller 307. In the present exemplary embodiment, the heating roller 307 is connected to a driving source M2. The driving source M2 rotationally drives the heating roller 307, which rotates the fixing belt 301.

The pressure roller 305 includes a core metal layer, an elastic layer, and a releasable layer. The elastic layer is formed on the outer periphery of the shaft. The releasable layer is formed on the outer periphery of the elastic layer. A steel use stainless (SUS) member with a diameter of 64 mm is used for the shaft. Conductive silicone rubber with a thickness of 8 mm is used for the elastic layer. PFA with a thickness of 100 μm as fluororesin is used for the releasable layer. The pressure roller 305 is axially supported by the fixing frame of the fixing device F. A gear is fixed to one end portion of the pressure roller 305. The pressure roller 305 is connected to and rotationally driven by a driving source M1 via the gear. The rotational driving of the pressure roller 305 rotates the belt 301. In the present exemplary embodiment, the belt 301 is configured to be rotated by the rotational driving of the pressure roller 305 and the heating roller 307.

The recording material P bearing the toner image is nipped at the fixing nip portion N formed between the belt 301 and the pressure roller 305, and the toner image is heated while the recording material P is being conveyed. In this manner, the fixing device F fixes the toner image to the nipped and conveyed recording material P. Thus, the fixing device F has both a function of applying heat and pressure, and a function of conveying the recording material P.

A pressure mechanism of the pressure roller 305 will now be described. The pressure roller 305 applies pressure from the driving source M2 to the pad 303 via the belt 301. A condition is set with a pressure force (NF) in the fixing nip portion N of 1600 N, a width of the fixing nip portion N in the X-direction (the conveyance direction) of 24.5 mm, and a width of the fixing nip portion N in the Y-direction (sheet width direction) of 326 mm.

The steering roller 308 is disposed in contact with the inner circumferential surface of the fixing belt 301. The steering roller 308 has a rotation center at one end or around its central portion. The steering roller 308 controls the position of the belt 301 rotationally driven in the Y-direction (sheet width direction) using the difference in tension generated by the rotation of the steering roller 308 on the belt 301 between the front side and the back side of the belt 301. The steering roller 308 includes a hollow SUS shaft with a diameter of φ20 mm. To increase the gripping force against the belt 301, a rubber material can be disposed on the surface of the steering roller 308.

Figure 4:
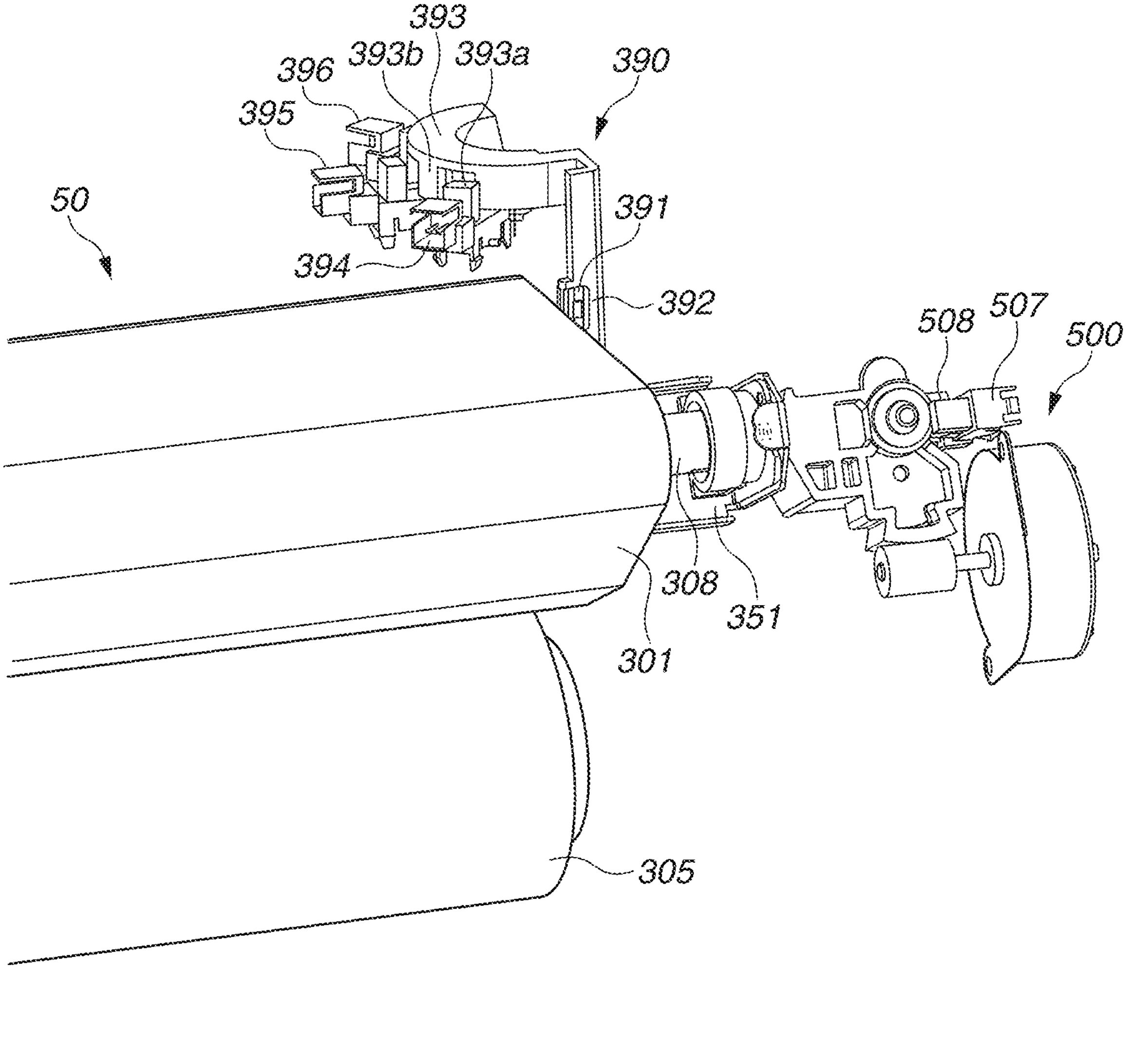
FIG. 4 is a perspective view illustrating a sensor unit.

The steering roller 308 presses the fixing belt 301 from the inside toward the outside to stretch the fixing belt 301 with a predetermined tensile force. To achieve this configuration, the steering roller 308 is urged by a spring (a torsion coil spring) 353. In this manner, the steering roller 308 has a function of applying a predetermined tensile force to the fixing belt 301. In the present exemplary embodiment, the steering roller 308 changes its rudder angle with respect to the central portion or one end portion in a rotational axis direction of the steering roller 308 as its rotation center, controlling lateral movement of the fixing belt 301 in the width direction (direction intersecting with the conveyance direction of the recording material P). More specifically, the steering roller 308 has a steering mechanism for adjusting the lateral movement of the fixing belt 301. The steering mechanism is provided with a sensor unit 390 that detects the position of an end portion of the fixing belt 301, which is illustrated in FIG. 4. The steering mechanism will be described next.

<Steering Mechanism>

The steering mechanism will now be described.

While an endless belt, such as the fixing belt 301, suspended by a plurality of suspension members, is being rotated, the rotating endless belt can move in a width direction as a lateral movement phenomenon. The lateral movement phenomenon is caused by shape errors of the endless belt or the rollers supporting the endless belt, or misalignment of the arrangement positions of the rollers. The lateral movement phenomenon with the fixing belt 301 of the fixing device F, illustrated in FIG. 2 can cause the fixing belt 301 to come into contact with another component, resulting in a torn fixing belt. To prevent this damage, it is necessary to reduce the lateral movement phenomenon with the fixing belt 301 in the fixing device F, illustrated in FIG. 2.

There is a known steering method for reducing the lateral movement of an endless belt, such as the fixing belt 301 as a representative technique. In the steering method, a steering roller as one of a plurality of rollers supporting the endless roller oscillates the endless belt to move the endless belt in the width directions, reducing the lateral movement phenomenon. This method is advantageous in reliability and longevity because of a small force applied to the endless belt compared with a method using a rib or a guide to reduce the movement of the endless belt in the width directions.

Additionally, the steering method can reduce a scratch caused by a cut edge of the recording material by moving the endless belt in the width directions. Repeated contact of the cut edge of the recording material with a certain region of the belt 301 in the fixing nip portion N can produce a linear scratch in the conveyance direction of the belt 301. To address this, the belt 301 is moved in the width direction so as to prevent the cut edge of the recording material from repeatedly contacting the certain region of the belt 301 in the steering method.

Figure 3:
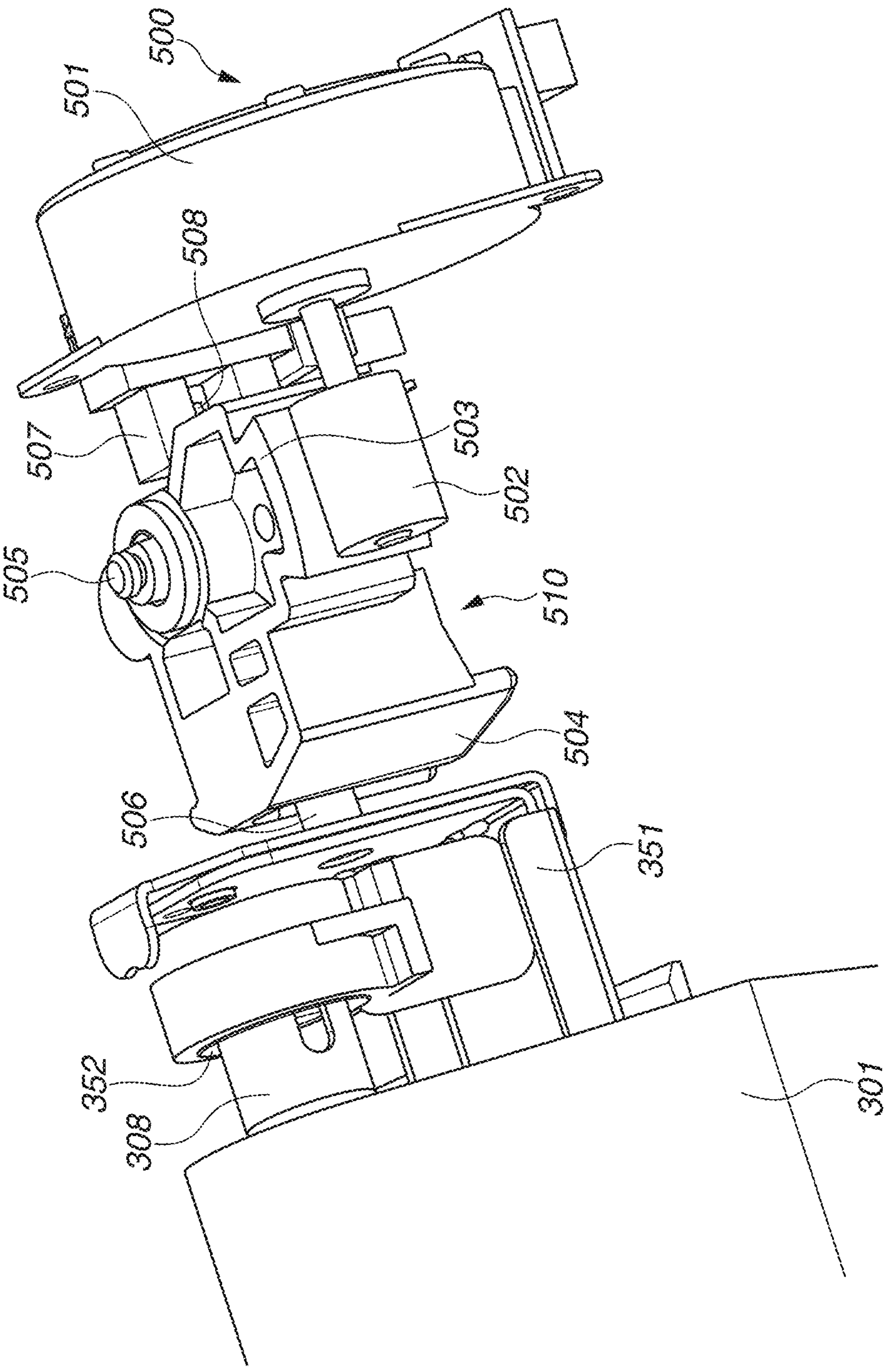
FIG. 3 is a perspective view illustrating a steering mechanism.

The steering mechanism will now be described with reference to FIG. 3. As illustrated in FIG. 3, a steering mechanism 500 includes a steering motor 501, a worm 502, a worm wheel 503, and a fork plate 504. The steering motor 501 is a stepping motor that rotates at a desired rate freely in its forward or reverse direction.

The rotation of the steering motor 501 rotates the worm 502 attached to the rotary shaft of the steering motor 501. The rotation of the worm 502 is converted into an oscillating motion in the corresponding direction orthogonal to the rotational axis of the steering motor 501 about a rotary shaft unit 505 as the center of the oscillating motion by a drive conversion unit 510, which is integrally formed of the worm wheel 503 and the fork plate 504. More specifically, the worm wheel 503 meshes with the worm 502, and is oscillatably disposed in the direction orthogonal to the rotational axis of the steering motor 501 as the rotation of the worm 502. To achieve this configuration, the mesh surface of the worm wheel 503 is formed in an arc shape so that the worm wheel 503 meshes with the worm 502 at the central portion in the rotational axis direction. In this manner, the drive conversion unit 510 can oscillate the rotary shaft unit 505 as the center of the oscillating motion via the worm 502 and the worm wheel 503 as the rotation of the steering motor 501.

The steering mechanism 500 also includes a steering operation shaft 506, a steering roller support arm 351, and a bearing portion 352. The steering operation shaft 506 and the steering roller support arm 351 are integrally formed and attached to the steering roller 308. The bearing portion 352 rotatably supports the rotary shaft of the steering roller 308.

The steering roller support arm 351 is disposed rotatably with respect to a steering base (not illustrated) inside the fixing belt 301 about the center in the width direction of the recording material P as a fulcrum. The steering roller support arm 351 holds the bearing portion 352 to rotatably support the steering roller 308.

The steering roller support arm 351 is fixed to the steering operation shaft 506 that is fitted into the above-mentioned drive conversion unit 510. While the steering operation shaft 506 engages with the fork plate 504 of the drive conversion unit 510, the steering operation shaft 506 can move together with the drive conversion unit 510. In this manner, the oscillation of the drive conversion unit 510 changes the inclination of the steering roller 308. More specifically, driving the steering motor 501 enables stepless change of the angle of the steering roller 308 to the heating roller 307 (see FIG. 2). Thus, changes in the torsion angle of the steering roller 308 to the heating roller 307 cause the rotating fixing belt 301 to move reciprocally in the width directions, allowing steering control of the fixing belt 301 to position the fixing belt 301 within a predetermined range in the width direction. The direction of the fixing belt 301 moved by the steering motor 501 being rotated forward to incline the steering roller 308 is opposite to the direction of the fixing belt 301 moved by the steering motor 501 being rotated backward to incline the steering roller 308.

In the present exemplary embodiment, "home positioning" of the steering motor 501 can be performed based on a detection result from a position sensor 507. The "home positioning" of the steering motor 501 herein is to rotate the steering motor 501 forward or backward as appropriate to drive the worm 502 without rotating the fixing belt 301 to position the fork plate 504 at a predetermined "home position". In the present exemplary embodiment, the "home position" is set around the boundary at which a lateral movement direction of the fixing belt 301 is switched from one end portion side to the other end side in the width direction. Specifically, the steering motor 501 is rotated forward when the position sensor 507 is in a shielded state, and the steering motor 501 is rotated backward when the position sensor 507 is in a non-shielded state. The "home position" is set at the boundary at which the position sensor 507 is switched from the shielded state to the non-shielded state, or from the non-shielded state to the shielded state, when the steering motor 501 is rotated forward or backward.

<Sensor Unit>

Returning to FIG. 2, the sensor unit 390 is provided in a part of the rotation path of the fixing belt 301 for detecting the position of the corresponding end portion of the fixing belt 301 in the width direction (hereinafter referred to as an end portion position). The position of the end portion of the rotating fixing belt 301 is detected based on an output signal from the sensor unit 390. The steering mechanism 500 illustrated in FIG. 3 is then operated based on the detected position of the end portion, enabling the rudder angle of the steering roller 308 to be adjusted. A configuration of the sensor unit 390 will now be described with reference to FIG. 4.

As illustrated in FIG. 4, the sensor unit 390 in the present exemplary embodiment mainly includes a contact member 391, an arm member 392, a sensor flag 393 as a detection member, and three sensors 394, 395, and 396. Optical sensors are used as the sensors 394, 395, and 396 as detection means, for example. The contact member 391 is disposed on one end of the arm member 392, in contact with the end portion of the fixing belt 301 in a width direction. The arm member 392 is urged by the torsion coil spring 353, illustrated in FIG. 2, against the fixing belt 301, and is rotatably provided so as to follow the movement of the fixing belt 301 in the width direction via the contact member 391. The sensor flag 393 provided on the sensor unit 390 is, for example, a sector cylindrical member, and a plurality of openings 393*a* and a plurality of to-be-detected portions (shield portions) 393*b* are formed in and on the outer circumferential surface having an arc shape. The three sensors 394, 395, and 396 are disposed at predetermined intervals in a direction of the movement of the sensor flag 393, facing the outer circumferential surface provided with the openings 393*a* and the to-be-detected portions 393*b*.

In the present exemplary embodiment, when the fixing belt 301 moves from one end side to the other end side in a width direction, the arm member 392 follows the end portion of the fixing belt 301 as the movement of the fixing belt 301, which pivotally moves the sensor flag 393. The pivotal movement of the sensor flag 393 changes the positional relationship between the sensors 394, 395, and 396, and the shield portions 393*b* (the openings 393*a*), which can thus switch the state of the sensors 394, 395, and 396. Specifically, the switching is made between a detection state where the sensors 394, 395, and 396 detect the shield portions 393*b* and a non-detection state where the sensors 394, 395, and 396 face the openings 393*a* and thus do not detect the shield portions 393*b*. In the present exemplary embodiment, the shield portions 393*b* (or the openings 393*a*) are formed on the sensor flag 393 so that any one of the sensors 394, 395, and 396 performs the above-mentioned switching between the detection state and the non-detection state. Details of the sensor flag 393 will be described below (see FIG. 6A).

<Control Unit>

As illustrated in FIG. 1, the image forming apparatus 1 includes the control unit 30. The control unit 30 will now be described using FIG. 5 with reference to FIGS. 2 to 4. Other than devices illustrated in the drawings, various kinds of devices, such as a motor and a power source, for operating the image forming apparatus 1 are connected to the control unit 30. However, these devices are not relevant to the gist of the present disclosure, and thus the description and illustration thereof are omitted.

An operation unit 4 is connected to the control unit 30 via an input/output interface. The operation unit 4 includes, for example, a touch-panel liquid crystal display screen (a display unit) that allows a user to input instructions of running programs for image forming job processing, or data, such as the size of a recording material P (A3, B4, for example). Various kinds of screens including software keys can be displayed on the liquid crystal display screen, allowing execution of various kinds of functions, such as an instruction for starting running an allocated program in response to the user's touch operation on a software key. Additionally, to make a notification to the user, the liquid crystal display screen displays various kinds of information, such as an operation status of the image forming apparatus 1 or error information. In other words, in the present exemplary embodiment, the operation unit 4 can function as notification means. A method for making notifications about various kinds of information, such as error information, is not limited to the above-mentioned notification method using display, and can be an appropriate notification method, such as a method using a sound made by sound generation means, such as a speaker.

The control unit 30 as control means performs various kinds of control, such as an image forming operation, and includes, for example, a central processing unit (CPU) 601 and a memory 602. The memory 602 includes a read-only memory (ROM), a random-access memory (RAM), for example. The memory 602 stores various kinds of programs for controlling the image forming apparatus 1 or various kinds of data. The CPU 601 can run various kinds of programs stored in the memory 602, enabling the operation of the image forming apparatus 1. In the present exemplary embodiment, the CPU 601 executes an "image forming job processing (program)" or the below-described "belt lateral movement control processing (program)" (see FIG. 7), stored in the memory 602. The memory 602 includes a sensor value table (see FIG. 8), which is referenced to determine the position of the end portion of the fixing belt 301 moved by the steering control or whether the sensor unit 390 is faulty during the belt lateral movement control processing. The memory 602 also temporarily stores results of calculation processing in the run of the various kinds of programs.

The control unit 30 is also connected to the driving motor M1, the steering motor 501, a temperature sensor 370, the halogen heater 306, the sensor unit 390, and the position sensor 507 via the input/output interface. If the operation unit 4 gives an instruction for starting an image forming job, the control unit 30 (specifically, the CPU 601) executes the image forming job stored in the memory 602. The control unit 30 controls the image forming apparatus 1 based on the execution of the image forming job. In this control, the control unit 30 drives the driving motor M1 to rotate the heating roller 307 to rotate the fixing belt 301. The control unit 30 also controls the halogen heater 306 based on a detection result from the temperature sensor 370 in such a manner that adjusts a surface temperature of the fixing belt 301 to a desired target temperature (for example, 180 C). Furthermore, the control unit 30 can perform the above-mentioned "home positioning" control of the steering motor 501 based on a detection result from the position sensor 507.

In the present exemplary embodiment, the control unit 30 controls the steering motor 501 based on a detection result from the sensor unit 390, specifically, based on a combination of output signals from three sensors 394, 395, and 396 (will be described below with reference to FIG. 6B). More specifically, the control unit 30 detects the position of the end portion of the fixing belt 301 based on a detection result from the sensor unit 390, and rotates the steering motor 501 forward or backward in accordance with an amount of rotation obtained based on the position of the end portion. In this manner, the control unit 30 performs the steering control of the fixing belt 301 by operating the above-mentioned steering mechanism 500 with the steering motor 501.

<Sensor Flag>

The above-mentioned sensor flag 393 will now be described with reference to FIGS. 6A and 6B.

Figures 6A, 6B:
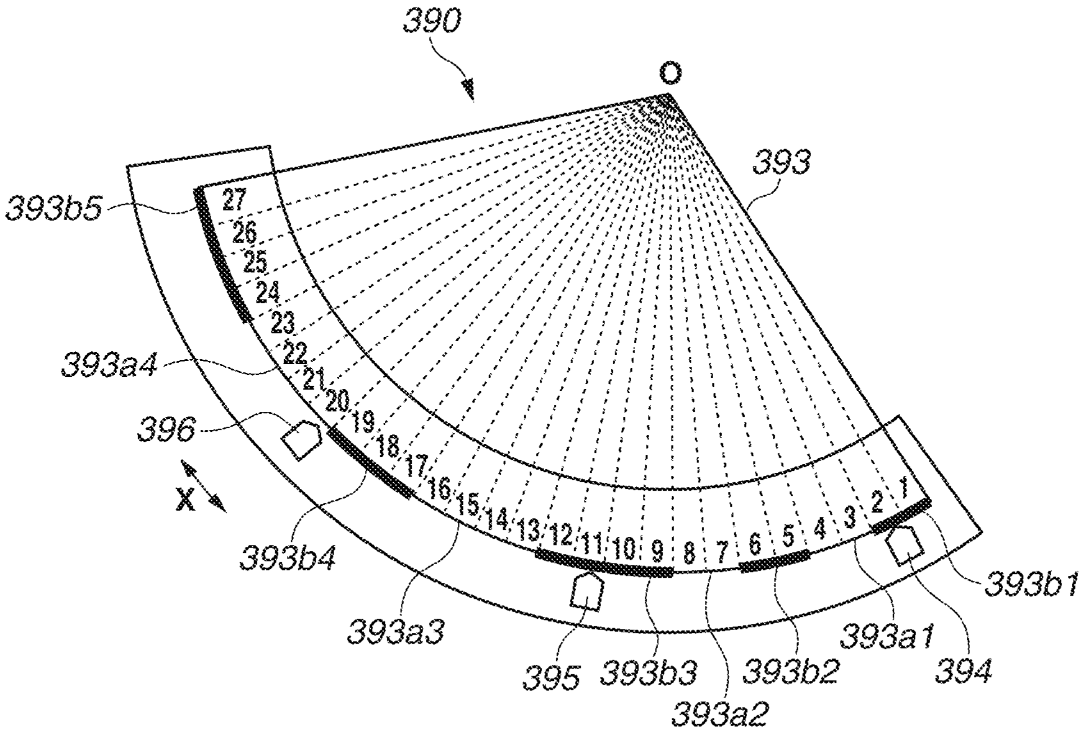
FIG. 6A and FIG. 6B are a view and a table, respectively, each illustrating a sensor flag.

FIG. 6A is a top view illustrating the sensor flag 393. FIG. 6B illustrates a combination of respective output signals from the sensors 394, 395, and 396 in a case where the sensor flag 393 is used. For example, the sensors 394, 395, and 396 each output "O" in the detection state of detecting any of shield portions 393*b*1 to 393*b*5, or, in the shielded state of being shielded by the shield portions 393*b*1 to 393*b*5. In contrast, the sensors 394, 395, and 396 each output "1" in the non-detection state of not detecting the shield portions 393*b*1 to 393*b*5, or, in an open state (also referred to as the non-shielded state) of facing any of openings 393*al* to 393*a*4.

In FIG. 6B, a "first sensor", a "second sensor", and a "third sensor" represent the sensor 394, the sensor 395, and the sensor 396, respectively, and the position of the belt corresponds to a value determined with a combination of the signals from the sensors 394, 395, and 396. In the present exemplary embodiment, the control unit 30 (see FIG. 5) detects the position of the end portion of the fixing belt 301 as one of nine segmented positions determined depending on a combination of the respective output signals (0 or 1) from the sensors 394, 395, and 396. For example, in a state of the sensor flag 393 illustrated in FIG. 6A, the position of the end portion of the fixing belt 301 is detected as the position of "back side 3", which is the one before the position of "overdisplacement on the back side".

In the present exemplary embodiment, the description has been given of the method for detecting the position of the fixing belt 301 in the width directions with the sensor flag 393 and the sensors 394, 395, and 396, but means of detecting the position of the fixing belt 301 in the width directions is not limited thereto, and for example, a line sensor or an eddy-current sensor can be used.

<Details of Lateral Movement Control>

Subsequently, details of the above-mentioned lateral movement control will now be described.

As described above, the lateral movement control is performed to reduce damage to the end portions of the fixing belt 301.

Additionally, the lateral movement control is performed with the aim of increasing the durability of the fixing belt 301 against the following phenomenon. When the recording material P passes through the fixing nip portion, a minute difference in speed in the conveyance direction between the fixing belt 301 and the end portions of the recording material P in the width directions causes frictional sliding between the fixing belt 301 and the end portions of the recording material P. This deteriorates the surface condition of the portions of the fixing belt 301 corresponding to the end portions of the recording material P that has passed in the width direction of the recording material P. If the deteriorated portion spreads into the image region, the deteriorated portion can present an uneven glossy surface of a fixed toner image. To address this, the lateral movement control is performed in such a manner that moves the fixing belt 301 reciprocally in the width direction orthogonal to the conveyance direction of the recording material P during the sheet conveyance. Dispersing the positions of the fixing belt 301 which the end portions of the recording material P pass can further increase the durability of the fixing belt 301 as compared with a case of not dispersing the positions.

<Lateral Movement Control During Sheet Conveyance>

Figure 7:
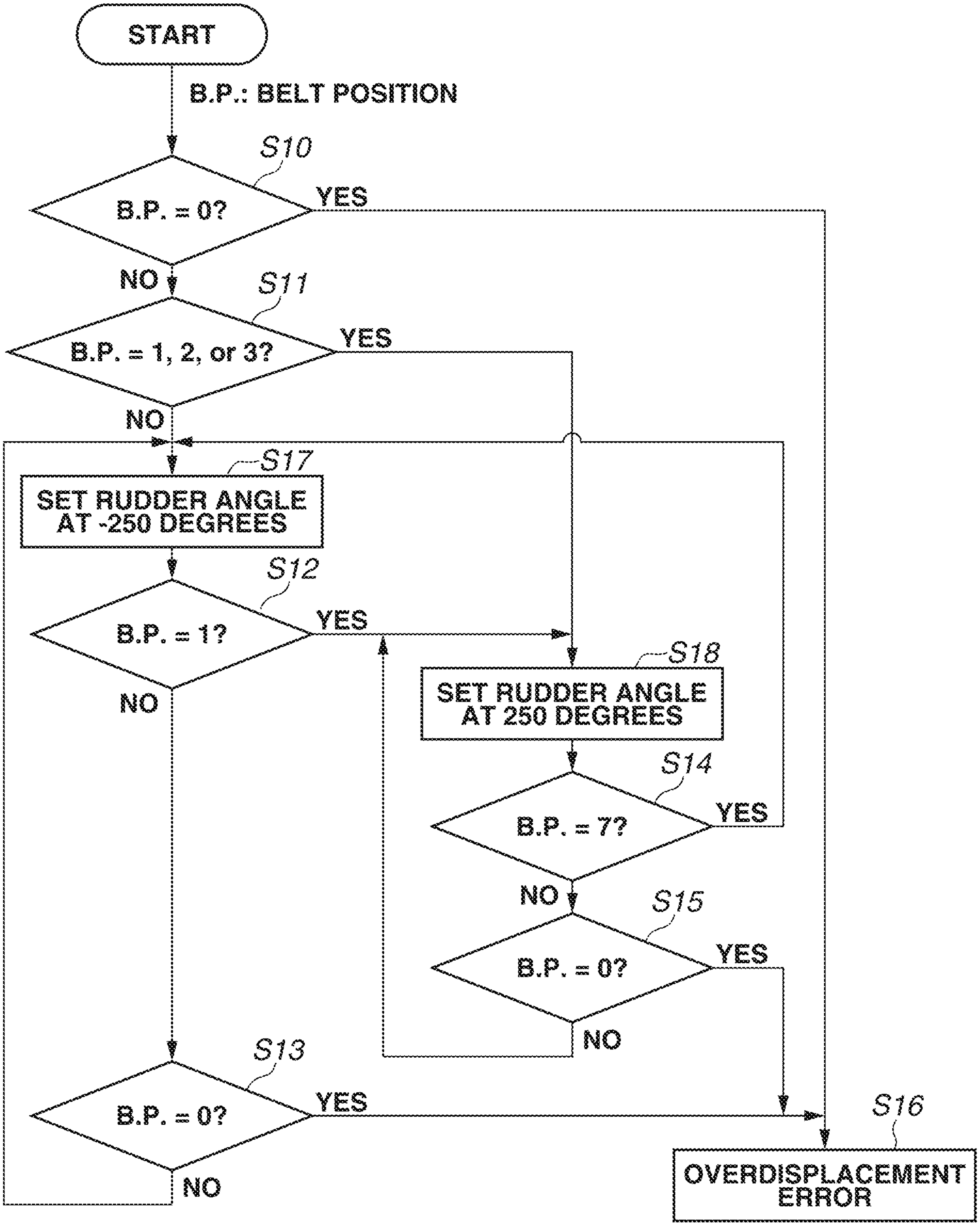
FIG. 7 is a flowchart of lateral movement control on a fixing belt.

The lateral movement control of the fixing belt 301 during the sheet conveyance will now be described with reference to a flowchart in FIG. 7. "B.P." in FIG. 7 stands for the belt position described in the preceding paragraphs.

The rudder angle is indicated by a positive/negative relationship defined by conversion of an amount of shift of the rudder angle from the above-mentioned "home position" into a motor pulse.

In step S10, when the image forming apparatus 1 is started, the CPU 601 checks the current belt position and determines whether the belt position is the belt position 0.

Figure 8:
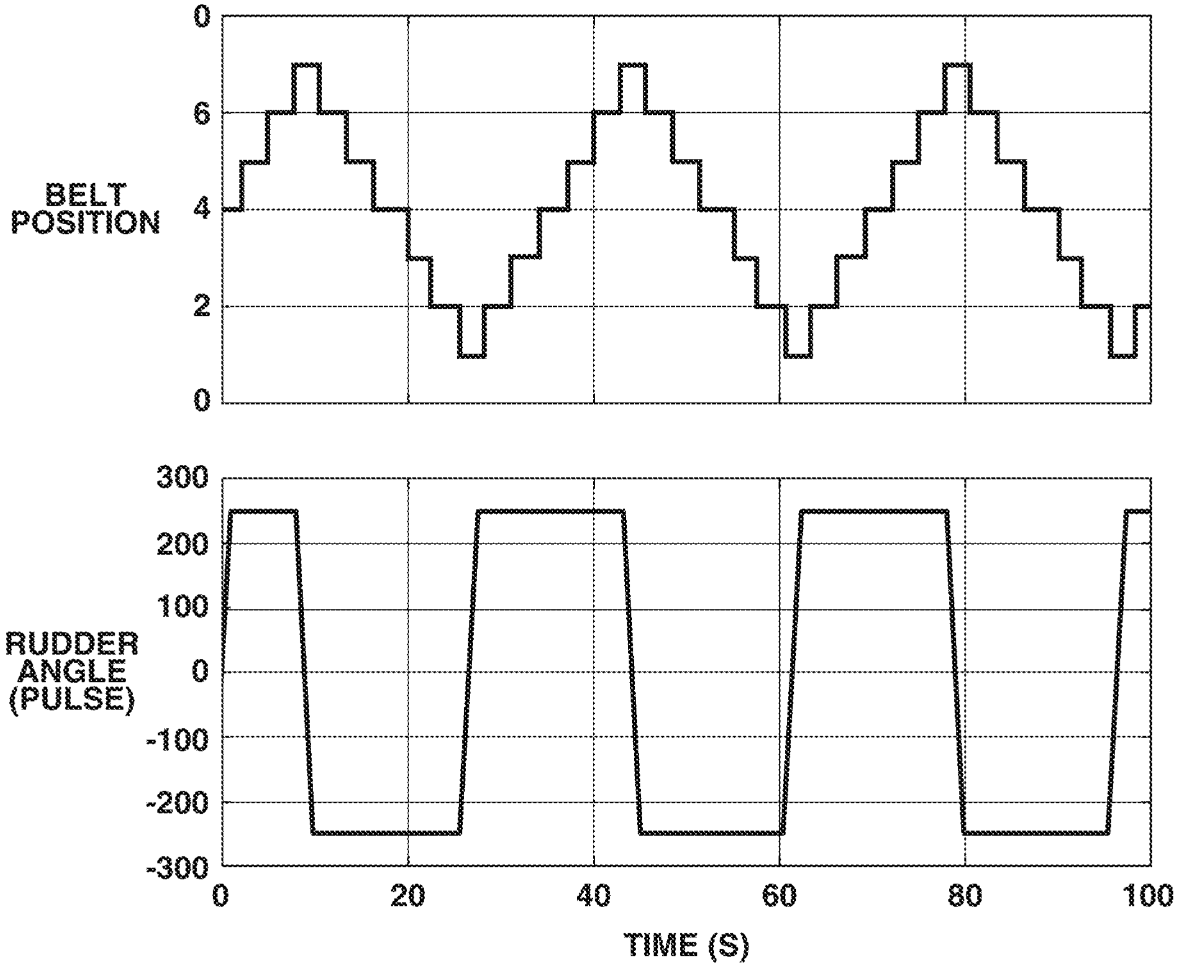
FIG. 8 illustrates graphs showing a relationship between belt positions of the fixing belt and rudder angles.

If the belt position is the belt position 0 (YES in step S10), the processing proceeds to step S16. In step S16, the CPU 601 stops the operation as an overdisplacement error. If the belt position is not the belt position 0 (NO in step S10), the processing proceeds to step S11. In step S11, the CPU 601 subsequently checks whether the belt position is one of belt positions 1 to 3. If the belt position is one of the belt positions 1 to 3 (YES in step S11), the processing proceeds to step S18. Otherwise, or if the belt position is one of belt positions 4 to 7 (NO in step S11), the processing proceeds to step S17. In step S17, the CPU 601 sets a rudder angle of −250 as an initial rudder angle. Thereafter, during the sheet conveyance in the image forming apparatus 1, the CPU 601 checks the belt position every approximately 0.2 seconds. In step S12, the CPU 601 determines whether the belt position becomes the belt position 1. If the belt position becomes the belt position 1 (YES in step S12), the processing proceeds to step S18. In step S18, the CPU 601 changes the rudder angle to a rudder angle of 250. In step S14, the CPU 601 determines whether the belt position becomes the belt position 7. If the belt position becomes the belt position 7 (YES in step S14), the processing proceeds to step S17. In step S17, the CPU 601 changes the rudder angle to a rudder angle of −250. The fixing belt 301 thus reciprocally moves between the belt positions 1 and 7 as illustrated in FIG. 8. In steps S13 and S15, the CPU 601 determines whether the belt position becomes the belt position 0. If the belt position becomes the belt position 0 (YES in step S13 or S15), the processing proceeds to step S16. In step S16, the control unit 30 stops the operation as an overdisplacement error. This control can be performed while reciprocally moving the fixing belt 301, reducing damage to the fixing belt 301.

<Occurrence of Overdisplacement of Fixing Belt in Consecutive Sheet Supply>

When the recording material P having a large paper thickness and a long length in the conveyance direction is caused to pass through the fixing nip portion N, a change occurs in the movement of the fixing belt 301 under the lateral movement control due to intervention of the paper. A description will be given of the change in lateral movement control performance with the recording material P at the fixing nip portion N with reference to FIGS. 9A to 9D.

Figure 9A:
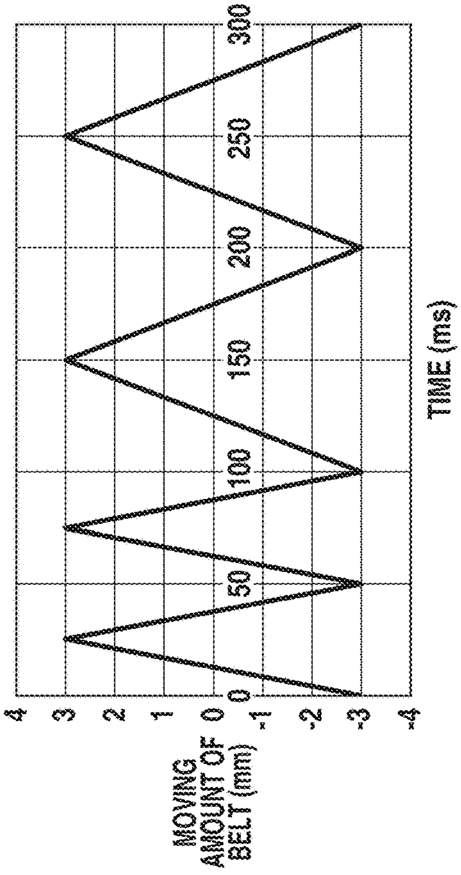
FIGS. 9A to 9D are graphs each illustrating a relationship between amounts of movement of the fixing belt and time.

FIG. 9A illustrates a relationship between amounts of movement of the fixing belt 301 in the width directions of the recording material P and time with a typical fixing device in use. The fixing nip portion N typically performs the lateral movement control following the flowchart in FIG. 7 described above. In the present exemplary embodiment, the control width is 3 mm from a median value in a width direction of the recording material P. With the recording material P being in the fixing nip portion N during the sheet conveyance, the contact between the fixing belt 301 and the pressure roller 305 is reduced due to the thickness of the recording material P, resulting in a lower lateral movement control performance of the fixing belt 301 in the fixing nip portion N. More specifically, a higher basis weight and a longer length of the recording material P in the conveyance direction reduce the contact area in the fixing nip portion N. Thus, this changes the lateral movement control performance of the fixing belt 301, causing the fixing belt 301 to laterally move in a direction orthogonal to the conveyance direction at speeds different from those in the case of no paper.

Figure 9B:
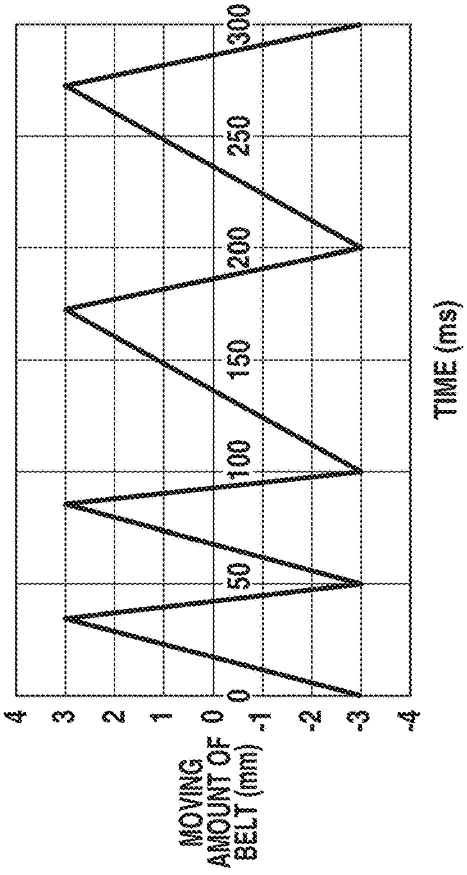

FIG. 9B illustrates a state where the lateral movement of the fixing belt 301 in the width direction orthogonal to the conveyance direction is unbalanced due to variations in tolerance of components, a change in surface condition of a member as the member is approaching the end of its life, for example. Differences in amount of the movement from the front side to the back side and from the back side to the front side increase, and the lateral movement toward one side becomes difficult. When the recording material P enters the fixing nip portion N in this state and intervenes between the fixing belt 301 and the fixing nip portion N, the lateral movement control performance of the fixing nip portion N deteriorates, with the speed of the lateral movement unbalanced. This presents a lower effect of the lateral movement control.

Figure 9C:
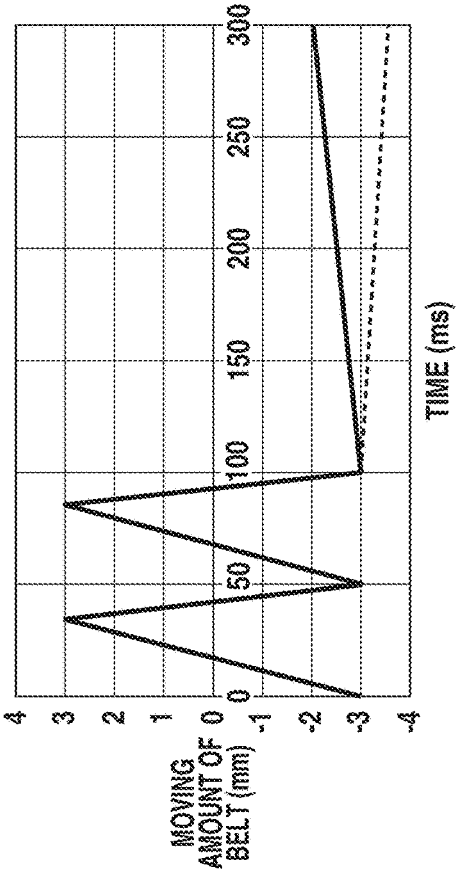

FIG. 9C illustrates amount of movement of the fixing belt 301 in the width directions orthogonal to the conveyance direction in consecutive sheet supply of thick, long sheets in the state illustrated in FIG. 9B. In FIG. 9C, a solid line indicates amount of movement of the fixing belt 301 with supply of sheets with a widened sheet interval, and a broken line indicates amount of the fixing belt 301 with supply of sheets with a predetermined sheet interval. It is found that the fixing belt 301 becomes less controllable to move laterally, especially to one side as compared with the state illustrated in FIG. 9B. If sheets with a large thickness and a long length in the conveyance direction continue to be consecutively supplied in the state indicated with the broken line, the amount of the movement goes beyond the lateral movement control performance of the image forming apparatus 1, as indicated with the dotted line in FIG. 9C, causing a failure in the lateral movement control as the overdisplacement of the fixing belt 301.

A sheet interval mentioned herein refers to the distance between one recording material and another recording material. This is the distance between a predetermined recording material and the recording material subsequent to the predetermined recording material.

<Recovery of Belt Position with Sheet Interval>

The above-mentioned overdisplacement of the fixing belt 301 is caused by elongated time during which the recording material P intervenes in the fixing nip portion N. The overdisplacement is also caused by the large thickness of the recording material P. Thus, the reduction of the lateral movement of the fixing belt 301 involves increasing the sheet interval to ensure sufficient time during which the lateral movement control performance is effective. Details will now be described.

Figure 5:
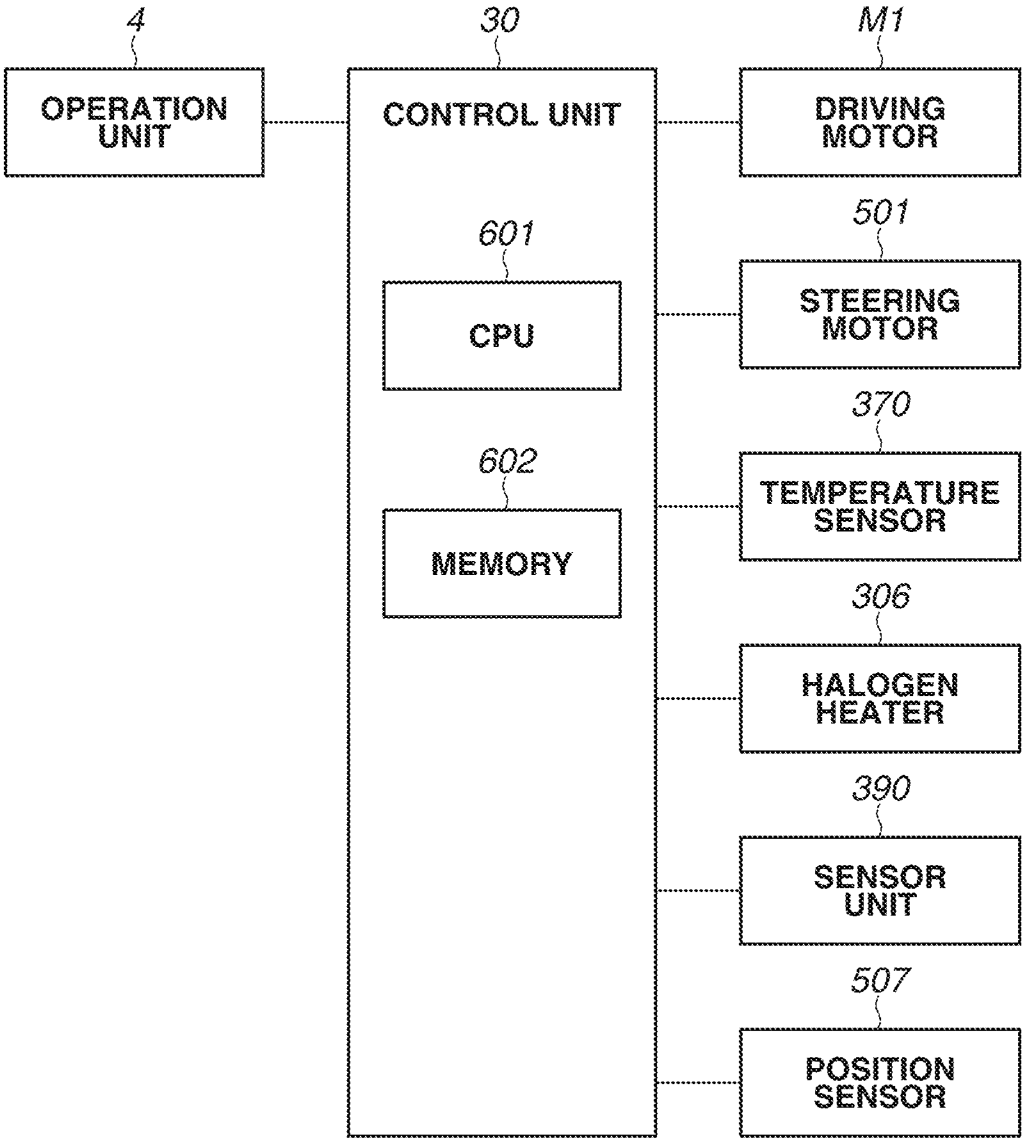
FIG. 5 is a block diagram illustrating a control unit.

The CPU 601, illustrated in FIG. 5, controls both the timing of conveying the recording material P and the sheet interval. The image forming apparatus 1 according to the present exemplary embodiment can convey the recording material P with at least two types of sheet intervals, and controls a first sheet interval, which is a predetermined sheet interval, and a second sheet interval that is larger than the first sheet interval. The CPU 601 uses the first sheet interval or the second sheet interval depending on the speed of the belt 301 moving in the width direction.

Figure 9D:
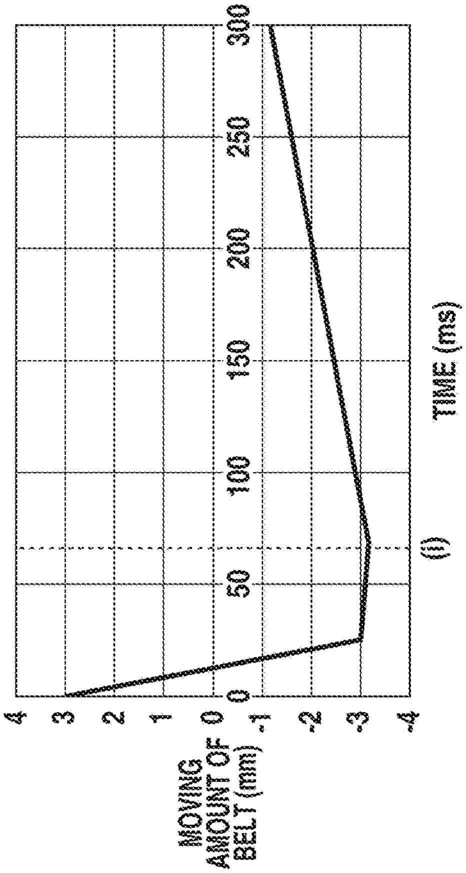

FIG. 9D is a graph illustrating a relationship between amounts of the movement in the width direction orthogonal to the conveyance direction and time with consecutive supply of thick and long sheets with a small sheet interval, and with the same condition other than a widened sheet interval. Similarly to the broken line in FIG. 9C described above, the amount of the movement goes beyond the lateral movement control performance of the image forming apparatus 1, causing a failure in the lateral movement control. It is found that, while the fixing belt 301 is approaching an overdisplacement position, the control of widening the sheet interval during the sheet conveyance is started at a time point (i) in FIG. 9D, which allows the position of the fixing belt 301 to be gradually controlled.

Thus, a widened sheet interval when the time of the lateral movement during the sheet conveyance elapses beyond the predetermined time prevents the overdisplacement of the fixing belt 301 from occurring.

<Adjustment of Sheet Interval Performed According to Time of Lateral Movement Control>

The lateral movement control performed according to the time of the lateral movement control during sheet conveyance according to the present exemplary embodiment will be described with reference to a flowchart illustrated in FIG. 10 and the block diagram illustrated in FIG. 5.

Upon reception of an instruction for energizing the image forming apparatus 1 (for example, turning on its power switch), the CPU 601 makes a transition to start-up control, and then is brought into a standby state of waiting for input of an instruction for printing. Thereafter, in step S101, in response to input of the instruction for printing, the CPU 601 starts a job.

In step S102, the CPU 601 performs the above-mentioned lateral movement control of the fixing belt 301 during the execution of the job.

In step S103, the CPU 601 acquires time information regarding time taken for the belt 301 to move into a predetermined section in the lateral movement control during the sheet conveyance. The position of the belt 301 is detected by the detection means. The detection means, which is the sensor unit 390, detects the position of the belt 301 in a width direction. For example, assume that the center position of the belt 301 in the width direction with the belt position 1 illustrated in FIG. 6B detected by the detection means is a first position. Additionally, assume that the center position of the belt 301 in the width direction with the belt position 2 illustrated in FIG. 6B detected by the detection means is a second position. The CPU 601 acquires, from the detection means, a detection result as the time from when the position of the belt 301 is changed to the first position until the position of the belt 301 is changed to the second position.

In step S104, the CPU 601 determines whether the acquired time is more than threshold.

If the time is more than the threshold (YES in step S104), the CPU 601 controls the sheet interval to be the second sheet interval corresponding to a state where the sheet interval is widened, and the processing proceeds to step S105. In step S105, the CPU 601 performs the sheet supply with the second sheet interval. In step S106, the CPU 601 ends the job. In step S107, after the end of the job, the CPU 601 controls the sheet interval to be the first sheet interval, which is the normal sheet interval.

If the acquired time is the threshold or less (NO in step S104), the processing proceeds to step S108. In step S108, the CPU 601 performs the sheet supply with the first sheet interval. In step S109, the CPU 601 ends the job.

This control can prevent the occurrence of the lateral movement of the fixing belt 301 caused by a lower lateral movement control performance due to the sheet conveyance.

In the present exemplary embodiment, the sheet interval is returned from the widened sheet interval to the normal sheet interval after the end of the job. However, the CPU 601 can acquire the time of the lateral movement control during the execution of a job and return the sheet interval to the normal sheet interval during the execution of the job. After step S105, the CPU 601 measures the time taken for the belt 301 to move from the first position to the second position. When the time is the threshold or less, the CPU 601 sets the sheet interval to the first sheet interval.

Assume that the rotation speed of the belt 301 is the same between the first sheet interval and the second sheet interval. Specifically, the rotation speeds of the pressure roller 305 and the heating roller 307 is kept the same between the first sheet interval and the second sheet interval. This can prevent the occurrence of the overdisplacement error only by changing the sheet interval without control for changing the rotation speed of the fixing belt 301.

The present exemplary embodiment has the configuration in which the CPU 601 acquires the time of the movement of the center position of the belt 301 from the first position to the second position, but the configuration is not limited thereto. The present exemplary embodiment can have a configuration of measuring the moving speed of the belt 301 in the width direction instead of the time.

In the sheet conveyance with the second sheet interval, the CPU 601 sets the angle of the steering roller 308 to an angle (second angle) smaller than that in the sheet conveyance with the first sheet interval. For example, assume that the belt 301 is moving from the first position (B.P.1) to the second position (B.P.2). When the center position of the belt 301 is moved to the second position, the CPU 601 sets the angle of the steering roller 308 at the time of the second sheet interval to an angle (second angle) smaller than the angle (first angle) of the steering roller 308 with the first sheet interval. This makes it easier to keep the recording material P at B.P.0 even if the steering effect is weakened by the recording material P intervening in the fixing nip portion N.

Assume that the angle of the steering roller 308 is zero degrees when the heating roller 307 and the steering roller 308 are in parallel. Additionally, assume that the angle between a line connecting the rotation center of the steering roller 308 and the end portion of the steering roller 308 in the parallel state and a line connecting the rotation center of the steering roller 308 and the end portion of the steering roller 308 after the rotation is the angle of the steering roller 308. The steering roller 308 after the rotation means the state in which the steering roller 308 is tilted the most.

Increased basis weight of the recording material increases presents a lower steering effect. Thus, the present exemplary embodiment can have a configuration in which the angle of the steering roller 308 is decreased with the second sheet interval and further with the basis weight of the recording material more than or equal to a predetermined basis weight.

In the present exemplary embodiment, the center position of the fixing belt 301 at B.P.0 coincides with the center position of the recording material in the sheet conveyance region.

A second exemplary embodiment will now be described. In the first exemplary embodiment, the description has been given of the configuration of widening the sheet interval when the moving time of the belt 301 is more than the threshold. In the second exemplary embodiment, a description is given of a configuration of increasing the rotation speed of the belt 301 when the moving time of the belt 301 is more than the threshold.

The overdisplacement of the fixing belt 301 is caused by elongated time during which the recording material P intervenes between the fixing nip portion N and the fixing belt 301. The issue can be solved only if the belt 301 is laterally moved with a sheet interval that produces a significant steering effect.

The CPU 601 controls the rotation speed of the fixing belt 301 to be a first rotation speed and a second rotation speed that is lower than the first rotation speed.

Figure 10:
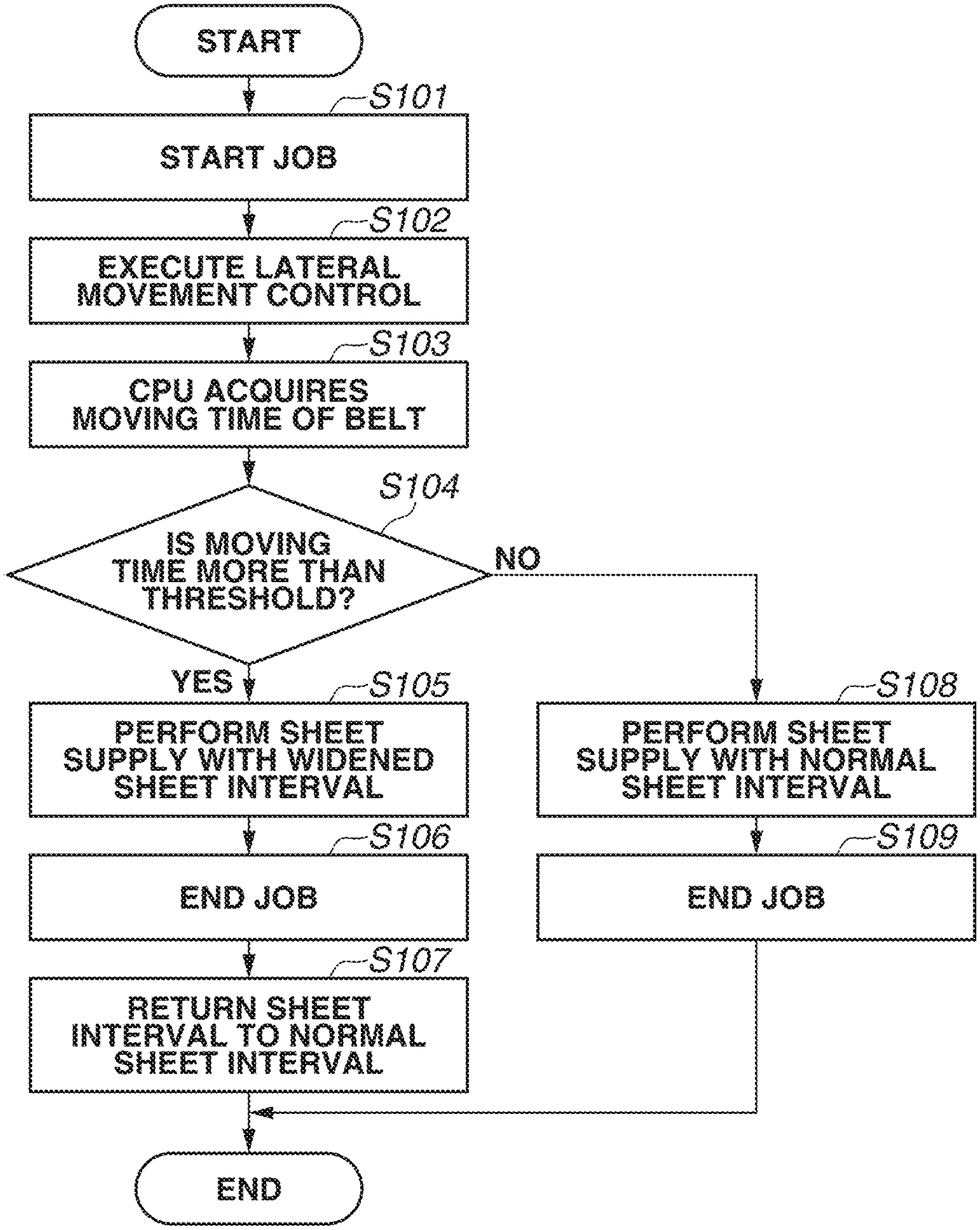
FIG. 10 is a flowchart of control for adjustment of a sheet interval according to the present exemplary embodiment.

In step S105 in FIG. 10, the CPU 601 changes the rotation speed of the belt 301 from the first rotation speed to the second rotation speed instead of widening the sheet interval. This can increase the time during which the recording material does not intervene between the fixing nip portion N and the fixing belt 301.

A third exemplary embodiment will be described. In the third exemplary embodiment, a predetermined job is used as a trigger while in the first exemplary embodiment, the moving time of the fixing belt 301 serves as a trigger for widening the sheet interval.

The overdisplacement of the fixing belt 301 occurs with a long length of the recording material P in the conveyance direction. Thus, to performing fixing to the recording material P with a predetermined or longer length, the method of, for example, widening the sheet interval is taken.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-103662, filed Jun. 23, 2023, which is hereby incorporated by reference herein in its entirety.

What is claimed is:

1. An image forming apparatus comprising:

a fixing belt having an endless shape and configured to be rotatable and apply heat to a recording material;

a pressure rotary body contacting an outer circumferential surface of the fixing belt to form a nip portion, and configured to fix, together with the fixing belt, a toner image to the recording material;

a nip forming member disposed on an inner circumferential surface of the fixing belt and forming, together with the pressure rotary body, the nip portion via the fixing belt;

a detection unit configured to detect a position of the fixing belt in a width direction of the recording material, the width direction being orthogonal to a conveyance direction of the recording material;

a steering roller configured to stretch and move the fixing belt in the width direction based on a detection result from the detection unit; and a control unit configured to control a sheet interval that is a distance between a predetermined recording material and a recording material subsequent to the predetermined recording material, wherein the control unit is configured to control the sheet interval to be a first sheet interval and a second sheet interval that is larger than the first sheet interval, wherein the control unit is configured to, in a case where time taken for a center position of the fixing belt to move, in the width direction, from a first position to a second position that is different from the first position is equal to or less than a threshold, control the sheet interval to be the first sheet interval, and wherein the control unit is configured to, in a case where the time taken for the center position of the fixing belt to move, in the width direction, from the first position to the second position is more than the threshold, control the sheet interval to be the second sheet interval.

2. The image forming apparatus according to claim 1, wherein the nip forming member is a pad.

3. The image forming apparatus according to claim 1, wherein a rotating speed of the fixing belt is the same between the case where the sheet interval is the first sheet interval and the case where the sheet interval is the second sheet interval.

4. The image forming apparatus according to claim 1, wherein, in a case where a recording material having a size smaller than a predetermined size is conveyed to the nip portion in the conveyance direction, when the center position of the fixing belt is located at a predetermined position during movement of the fixing belt from one end side of the fixing belt toward another end side of the fixing belt in the width direction, the steering roller has a first angle, and wherein, in a case where a recording material having a size larger than the predetermined size is conveyed to the nip portion in the conveyance direction, when the center position of the fixing belt is located at the predetermined position during the movement of the fixing belt from the one end side of the fixing belt toward the other end side of the fixing belt in the width direction, the steering roller has a second angle.

5. The image forming apparatus according to claim 4, wherein, in a case where a recording material to be conveyed to the nip portion has a basis weight that is higher than a predetermined basis weight, when the center position of the fixing belt is located at the predetermined position during the movement of the fixing belt from the one end side of the fixing belt toward the other end side of the fixing belt in the width direction, the steering roller has the second angle that is smaller than the first angle.

6. The image forming apparatus according to claim 5, wherein the predetermined position is located, in the width direction, on the one end side of a center position of a sheet conveyance region of the recording material.

7. An image forming apparatus comprising:

a fixing belt having an endless shape and configured to be rotatable and apply heat to a recording material;

a pressure rotary body contacting an outer circumferential surface of the fixing belt to form a nip portion, and configured to fix, together with the fixing belt, a toner image on the recording material;

a nip forming member disposed on an inner circumferential surface of the fixing belt and forming, together with the pressure rotary body, the nip portion via the fixing belt;

a detection unit configured to detect a position of the fixing belt in a width direction of the recording material, the width direction being orthogonal to a conveyance direction of the recording material;

a steering roller configured to stretch and move the fixing belt in the width direction based on a detection result from the detection unit; and a control unit configured to control a rotation speed of the fixing belt, wherein the control unit is configured to, in a case where time taken for a center position of the fixing belt to move, in the width direction, from a first position to a second position that is different from the first position is equal to or less than a threshold, control the rotation speed of the fixing belt to be first speed, and wherein the control unit is configured to, in a case where time taken for the center position of the fixing belt to move, in the width direction, from the first position to the second position is more than the threshold, control the rotation speed of the fixing belt to be second speed.

* * * * *